United States Patent

[11] 3,611,168

[72] Inventor Theodore F. Haggai Costa Mesa, Calif.
[21] Appl. No. 24,046
[22] Filed Mar. 24, 1970
[45] Patented Oct. 5, 1971
[73] Assignee Hughes Aircraft Company Culver City, Calif.

[54] THRESHOLD EXTENSION PHASE-LOCK DEMODULATOR
3 Claims, 9 Drawing Figs.

[52] U.S. Cl. .......... 329/122, 325/346, 325/419, 331/18, 331/23
[51] Int. Cl. .......... H03d 3/24
[50] Field of Search .......... 329/122; 331/17, 18, 23, 25; 325/346, 419

[56] References Cited

UNITED STATES PATENTS

| | | | |
|---|---|---|---|
| 3,209,271 | 9/1965 | Smith | 329/122 |
| 3,286,188 | 11/1966 | Castellano | 329/122 |
| 3,393,380 | 7/1968 | Webb | 331/25 X |
| 3,551,829 | 12/1970 | Haggai | 329/122 |

*Primary Examiner*—Alfred L. Brody
*Attorneys*—James K. Haskell and Paul M. Coble ABSTRACT: A phase detector, a filter and a voltage-controlled oscillator are coupled in a phase-lock loop. The filter, which may be active or passive, has a complex frequency signal transfer function $F(s)$ given essentially by:

$$F(s)=K_f\frac{1+2\zeta_z\frac{s}{\omega_z}+\frac{s^2}{\omega_z^2}}{1+2\zeta_p\frac{s}{\omega_p}+\frac{s^2}{\omega_p^2}},$$

where $K_f$ is a preselected scale factor, $\omega_z$ and $\omega_p$ are frequencies of conjugate complex zeros and poles, respectively, with $|\omega_z|>|\omega_p|$, and $\zeta_z$ and $\zeta_p$ are damping ratios of the complex zeros and poles, respectively, with $\zeta_p<\zeta_z<1$.

INVENTOR.
THEODORE F. HAGGAI,

Paul M. Coble

ATTORNEY.

THRESHOLD EXTENSION PHASE-LOCK DEMODULATOR

This invention relates to frequency demodulation, and more particularly relates to a frequency demodulator which uniquely incorporates a special RLC filter in a phase-lock loop so as to significantly extend the signal-to-noise threshold level of the demodulator.

Due to their automatic tracking and excellent signal-to-noise capabilities, phase-lock loops are becoming increasingly important to the frequency demodulation art. In such loops a phase detector compares the instantaneous frequency of a frequency or phase-modulated input signal with that of a reference signal and provides a voltage whose amplitude is indicative of the detected frequency difference. This difference voltage is passed through a low pass filter to produce a control voltage which is fed back to a voltage-controlled oscillator which generates the aforementioned reference signal. The reference signal frequency is thus varied in accordance with the control voltage in a manner which reduces the instantaneous frequency difference between the input signal and the reference signal, causing the reference signal frequency to follow, or "track," the input signal frequency. Since the phase-lock loop need pass only the frequency difference between the input signal and the reference signal, the loop bandwidth can be much smaller than that of a demodulator for comparable modulating frequencies which does not employ a phase-lock loop. Thus, the phase-lock loop is able to vastly reduce the spectrum of noise frequencies passed by the demodulator.

Frequency demodulators, including those utilizing a phase-lock loop, are characterized by a threshold level, above which the output signal-to-noise ratio increases linearly with an increasing input carrier-to-noise ratio, but below which a very rapid deterioration of the output signal-to-noise ratio occurs for a slight decrease in the input carrier-to-noise ratio. The output signal-to-noise ratio can be increased by increasing the modulation index, i.e., the ratio of the frequency deviation of the modulated signal to the frequency of the modulating signal. Since an increase in the frequency deviation necessitates an increase in the bandwidth of the phase-lock loop, the range of noise frequencies passed by the loop increases as the modulation index is increased. As a result, the input carrier-to-noise ratio at which the aforementioned threshold phenomenon occurs is also increased.

In the prior art it is common to employ phase-lock loops of the second order, i.e., loops for which the closed loop signal transfer function is a second-order polynomial. Although frequency demodulators incorporating second-order phase-lock loops afford increased threshold sensitivity over frequency demodulators which do not employ phase-lock techniques, nevertheless, the resultant threshold level is still excessive for some applications, and in addition this threshold level increases relatively rapidly with increasing modulation index.

A third-order phase-lock loop has been proposed in which the loop filter transfer function has a pair of poles at the origin of the complex frequency ($s$) plane. Although such a third-order phase-lock loop provides a more desirable open loop gain versus modulating frequency characteristic than a second-order loop, little improvement is realized in the loop signal-to-noise capabilities. Moreover, the aforementioned third-order loop is more complex, requires more parts, and is more difficult to stabilize than a second-order loop.

Accordingly, it is an object of the present invention to provide a phase-lock demodulator which affords a considerable improvement in signal-to-noise capabilities over that achievable with otherwise comparable phase-lock demodulators utilizing a second-order loop, while at the same time essentially retaining the simplicity and high stability of a second-order loop demodulator.

It is a still further object of the invention to provide a phase-lock demodulator in which, for comparable input signal parameters, the demodulator threshold level is extended to lower input carrier-to-noise ratios than has heretofore been achieved.

It is still another object of the invention to provide a phase-lock demodulator which, for the same input carrier-to-noise ratio, can provide by appropriate modulation index selection a higher output signal-to-noise ratio than in the prior art.

It is yet a further object of the invention to provide a frequency demodulator which, in addition to possessing the aforementioned improved signal-to-noise capabilities, incorporates a third-order phase-lock loop which is simpler in design and more stable in operation than third-order phase-lock loops of the prior art.

In accordance with the foregoing objects, a phase-lock demodulator according to the invention includes a phase detector for providing a signal indicative of the instantaneous frequency difference between the frequency of an input signal and the frequency of a reference signal, a voltage-controlled oscillator for generating the reference signal, and a special filter coupled in a phase-lock loop between the phase detector and the voltage-controlled oscillator. The filter has a complex frequency signal transfer function $F(s)$ given essentially by:

$$F(s) = K_f \frac{1 + 2\zeta_z \frac{s}{\omega_z} + \frac{s^2}{\omega_z^2}}{1 + 2\zeta_p \frac{s}{\omega_p} + \frac{s}{\omega_p^2}},$$

where $K_f$ is a preselected scale factor, $\omega_z$ and $\omega_p$ are frequencies of conjugate complex zeros and poles, respectively, with $|\omega_z| > |\omega_p|$, and $\zeta_z$ and $\zeta_p$ are damping ratios of the complex zeros and poles, respectively, with $\zeta_p < \zeta_z < 1$.

A phase-lock loop according to the invention provides a relatively high and substantially constant open loop gain throughout the modulating frequency range of interest, but for higher modulating frequencies the open loop gain decreases at a very rapid rate as a function of increasing frequency. The high and substantially constant open loop gain at the desired modulating frequencies enables high fidelity tracking to be achieved. The rapid decrease in open loop gain at the higher frequencies provides a reduced bandwidth at unity open loop gain, thereby reducing the closed loop noise bandwidth and enabling the aforementioned high signal-to-noise capabilities to be achieved.

Additional objects, advantages and characteristic features of the present invention will be apparent from the following detailed description of preferred embodiments of the invention when considered in conjunction with the accompanying drawings in which.

Figures 1, 2, 3, 4:
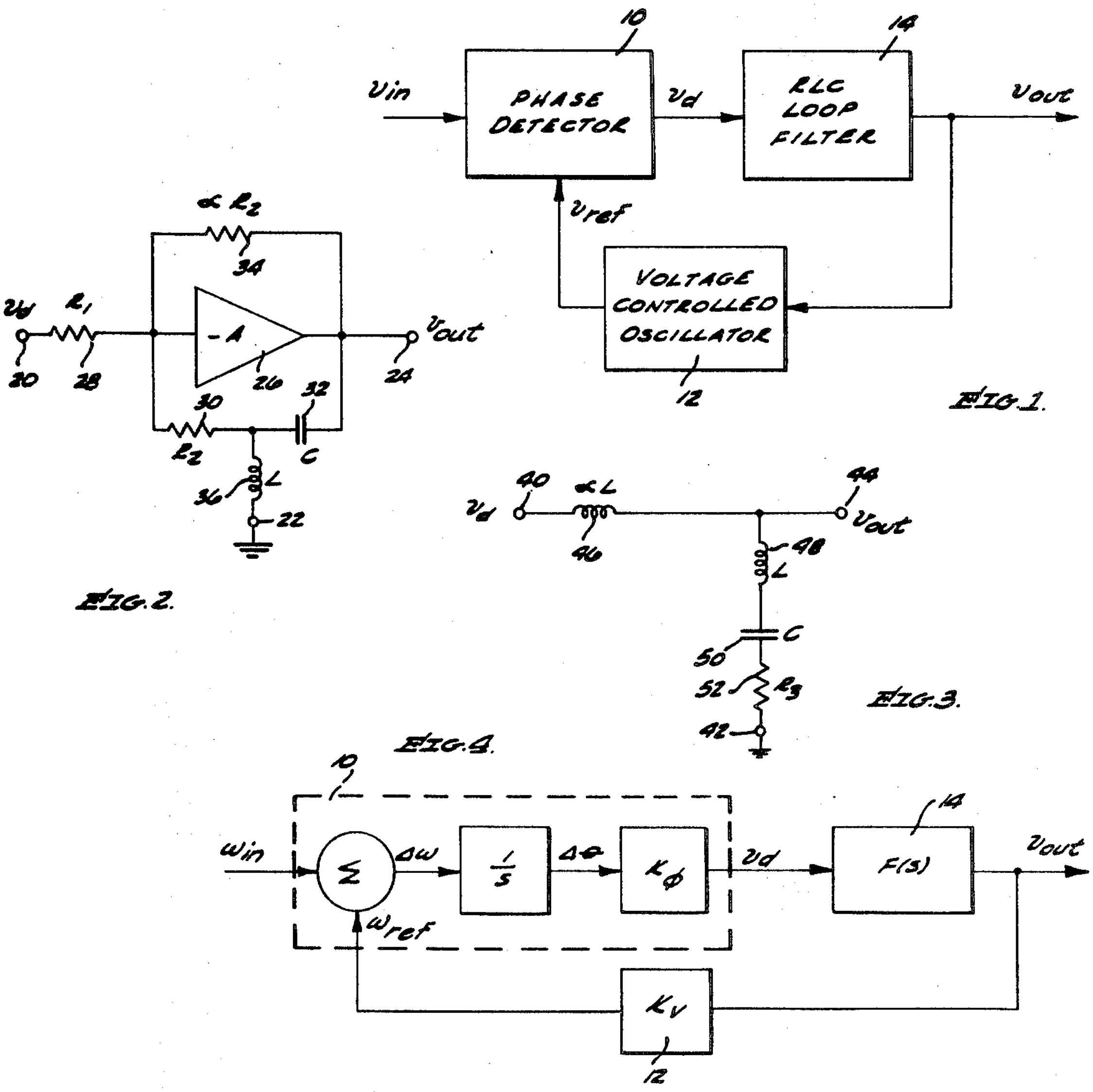
FIG. 1 is a block diagram of a phase-lock demodulator in accordance with the invention.
FIG. 2 is a schematic circuit diagram illustrating a particular active filter which may be used as the RLC loop filter of the demodulator of FIG. 1 in accordance with one embodiment of the invention.
FIG. 3 is a schematic circuit diagram illustrating a particular passive filter which may be used as the RLC loop filter of the demodulator of FIG. 1 in accordance with another embodiment of the invention.
FIG. 4 is a block diagram of an analytical model representing the behavior of the demodulator of FIG. 1.
Figures 8, 9:
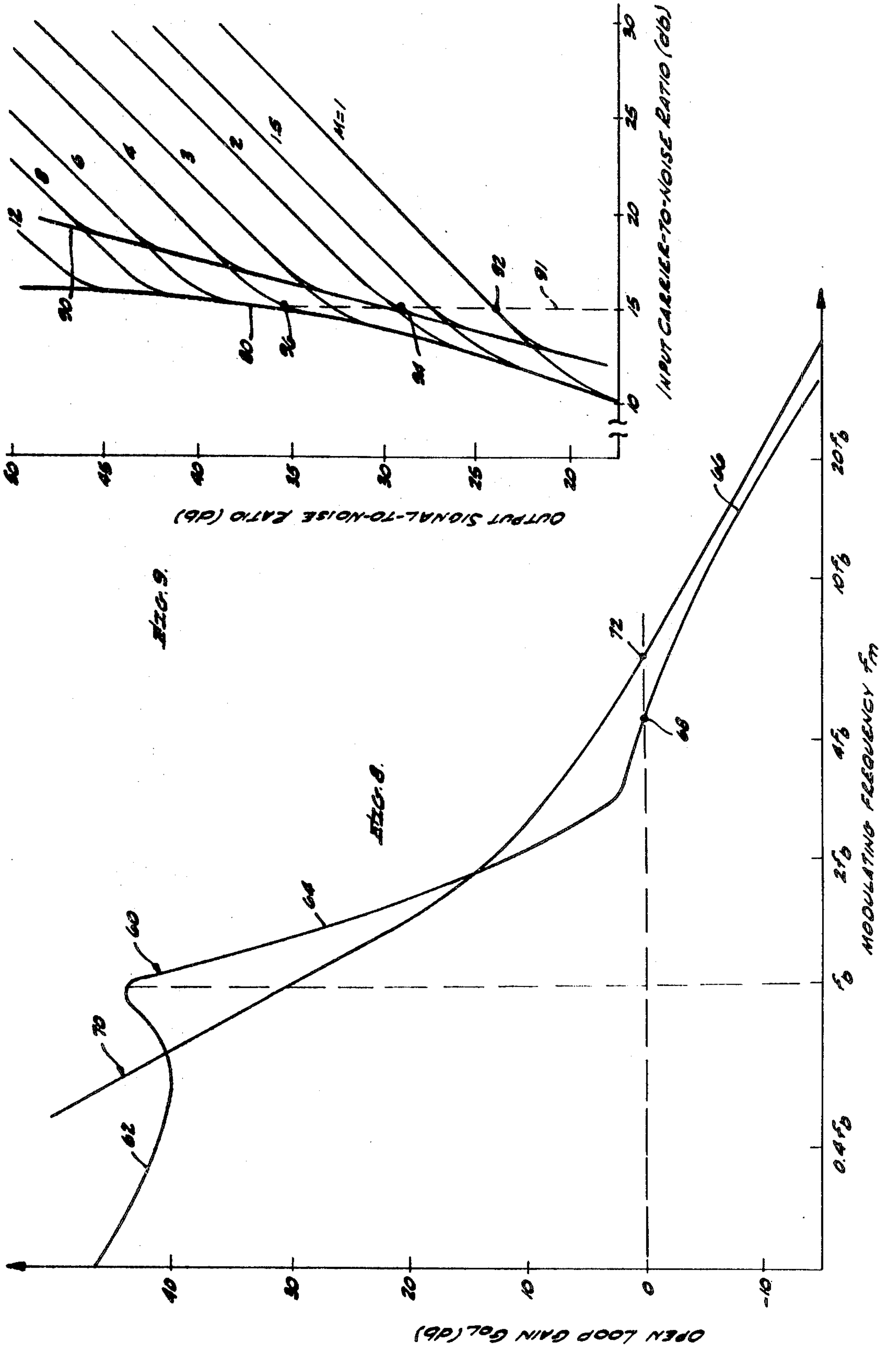

FIG. 8 is a graph illustrating the open loop gain as a function of modulating frequency for both a phase-lock demodulator according to the invention and a third-order phase-lock loop demodulator of the prior art designed to process input signals of the same parameters; and FIG. 9 is a graph illustrating the output signal-to-noise ratio as a function of input carrier-to-noise ratio at various modulation indices for both a phase-lock demodulator according to the invention and the aforementioned prior art third-order phase-lock loop demodulator. Referring to FIG. 1 with greater particularity, a phase-lock demodulator according to the invention may be seen to include a phase detector 10 which compares the instantaneous frequency of an input frequency modulated carrier voltage $v_{in}$ with the frequency of a reference voltage $v_{ref}$ generated by a voltage-controlled oscillator 12 and produces a voltage $v_d$ having an amplitude proportional to the phase difference between the voltages $v_{in}$ and $v_{ref}$. The phase-detector output voltage $v_d$ is applied to a special low-pass RLC loop filter 14 (to be described in more detail below) which provides the output voltage $v_{out}$ from the demodulator of the invention. The voltage $v_{out}$ is also fed back to the voltage-controlled oscillator 12 to control the oscillation frequency of the oscillator 12 in accordance with the voltage $v_{out}$ and thereby cause the frequency of the reference voltage $v_{ref}$ to track the frequency of the input voltage $v_{in}$.

A specific active filter which may be used as the loop filter 14 is shown in FIG. 2. In the filter of FIG. 2 the voltage $v_d$ is applied between filter input terminal 20 and common terminal 22, while the output voltage $v_{out}$ is obtained between output terminal 24 and the terminal 22. An operational amplifier 26 providing a gain $-A$ (which theoretically approaches infinity) has an output terminal connected to the filter output terminal 24. A first resistor 28 providing a resistance $R_1$ is connected between input terminal 20 and an input terminal to the operational amplifier 26, while a second resistor 30 providing a resistance $R_2$ and a capacitor 32 providing a capacitance $C$ are connected in series between the input and output terminals of the amplifier 26. A third resistor 34 providing a resistance $\alpha R_2$, where $\alpha$ is a selected filter attenuation constant which typically may range in value from about 2 to 8, is connected in parallel with resistor 30 and capacitor 32. An inductor 36 providing an inductance $L$ is connected between the junction between resistor 30 and capacitor 32 and common terminal 22. The respective resistance, inductance, and capacitance values $R_2$, $L$, and $C$, and the filter attenuation constant $\alpha$ determine the resonant frequencies and the damping ratios for the zeros and poles of the transfer function for the filter 14, while the resistance value $R_1$ is used in setting the filter scale factor (gain), as will be explained more fully below.

A particular passive filter which may be used as the loop filter 14 is illustrated in FIG. 3. In the filter of FIG. 3 the voltage $v_d$ is applied between filter input terminal 40 and common terminal 42, while the output voltage $v_{out}$ is obtained between output terminal 44 and the terminal 42. A first inductor 46 providing an inductance $\alpha L$ is connected directly between the filter input and output terminals 40 and 44, respectively. A second inductor 48 providing an inductance $L$, a capacitor 50 providing a capacitance $C$, and a resistor 52 providing a resistance $R_3$ are connected in series between output terminal 44 and the common terminal 42. The filters of FIGS. 2 and 3 are equivalent in that they can be designed to provide the same complex frequency signal transfer function, and the same equations govern the location of the poles and zeros and their damping ratios. Thus, the same values for $L$, $C$ and $\alpha$ may be used in the filters of FIGS. 2 and 3. The resistance value $R_3$ in the filter of FIG. 3 is related to the resistance value $R_2$ in the filter of FIG. 2 by:

$$R_3 = L/C/R_2 \qquad (1)$$

An analytical model representing the behavior of the demodulator of FIG. 1 is given in block diagram form in FIG. 4, components within the dashed lines 10 depicting the behavior of the phase detector 10. As explained above, the function of the phase detector 10 is to compare the instantaneous frequency $\omega_{in}$ of the input voltage $v_{in}$ with the frequency $\omega_{ref}$ of the reference voltage $v_{ref}$ and to produce a signal indicative of the frequency difference $\Delta\omega$ between these frequencies. The integral of the frequency difference $\Delta\omega$ is the phase difference $\Delta\theta$ which, when multiplied by the phase-detector scale factor $K$ (volts per radian), provides the phase-detector output voltage $v_d$. The loop filter 14 functions to multiply the voltage $v_d$ by the complex frequency signal transfer function $F(s)$ to produce the output voltage $v_{out}$. The voltage-controlled oscillator 12 multiplies the voltage $v_{out}$ by the oscillator scale factor $K_v$ (radians per second per volt) to produce the reference voltage $v_{ref}$ at the frequency $\omega_{ref}$.

The RLC loop filter 14 is specially designed to have a complex frequency signal transfer function $F(s)$ given by:

$$F(s) = K_f \frac{1 + 2\zeta_z \dfrac{s}{\omega_z} + \dfrac{s^2}{\omega_z^2}}{1 + 2\zeta_p \dfrac{s}{\omega_p} + \dfrac{s^2}{\omega_p^2}}, \qquad (2)$$

In equation (2) $K_f$ is a preselected filter scale factor, $\omega_z$ and $\omega_p$ are frequencies of conjugate complex zeros and poles, respectively and $\zeta_z$ and $\zeta_p$ are respective damping ratios of the complex zeros and poles.

Figure 5:
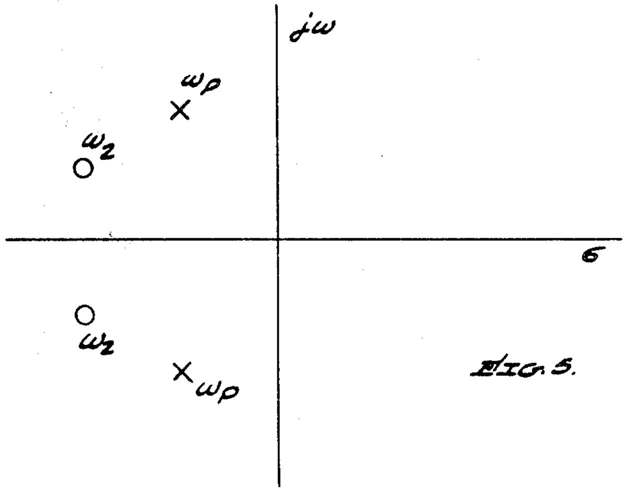
FIG. 5 is a graph in the complex frequency ($s$) plane showing zeros and poles of the generalized transfer function for the RLC loop filter of the demodulator of FIG. 1.

As shown in FIG. 5, the zeros and poles are selected such that the magnitude of the zero resonant frequency $|\omega_z|$ (represented in FIG. 5 by the distance from the origin to the zero) is greater than the magnitude of the pole-resonant frequency $|\omega_p|$ (represented in FIG. 5 by the distance from the origin to the pole). Moreover, the zero-and pole-damping ratios $\zeta_z$ and $\zeta_p$, respectively, are selected such that $\zeta_p < \zeta_z < 1$. The damping ratios are equal to the magnitude of the sin of the angle between the $j\omega$-axis and a vector drawn from the origin to the pole or zero.

The relationships between the zero- and pole-resonant frequencies $\omega_2$ and $\omega_p$, respectively, and the damping ratios $\zeta_z$ and $\zeta_p$ of the transfer function $F(s)$ in equation (2) and the circuit parameter values $R_2$, $L$, $C$, and $\alpha$ for the filter of FIG. 2 are as follows:

$$\omega_z = \frac{1}{\sqrt{LC}} \qquad (3)$$

$$\omega_p = \frac{\omega_z}{\sqrt{1+\alpha}} \qquad (4)$$

$$\zeta_z = \frac{1}{2R_2}\sqrt{\frac{L}{C}} \qquad (5)$$

$$\zeta_p = \frac{\zeta_z}{\sqrt{1+\alpha}} \qquad (6)$$

Equations (3) through (6) are also applicable in relating $\omega_z$, $\omega_p$, $\zeta_z$ and $\zeta_p$ to the circuit parameters $R_3$, $L$, $C$ and $\alpha$ for the filter of FIG. 3, although equation (1) must additionally be used to relate $R_3$ of FIG. 3 to $R_2$ of FIG. 2.

The filter scale factor $K_f$ is equal to unity for the passive filter of FIG. 3, while for the active filter of FIG. 2, $K_f$ is given by:

$$K_f = \alpha R_2/R_1 \qquad (7)$$

From FIG. 4 it may be seen that the open-loop gain $G_{OL}(s)$ for the phase-lock loop of the demodulator is given by:

$$G_{OL}(s) = \frac{K_\phi K_v F(s)}{s} \qquad (8)$$

Substituting equation (2) into equation (8) yields:

$$G_{OL}(s) = \frac{1 + 2\zeta_z \dfrac{s}{\omega_z} + \dfrac{s^2}{\omega_z^2}}{\dfrac{s}{K}\left[1 + 2\zeta_p \dfrac{s}{\omega_p} + \dfrac{s^2}{\omega_p^2}\right]} \qquad (9)$$

where $K$ is a loop scale factor given by:

$$K = K_\phi K_v K_f \qquad (10)$$

The closed-loop gain $G_{CL}(s)$ for the phase-lock loop may be computed from:

$$G_{CL} = \frac{G_{OL}}{1 + G_{OL}} = \frac{N/D}{1 + N/D} = \frac{N}{N+D} \qquad (11)$$

where $N$ represents the numerator of the expression for the open-loop gain $G_{OL}$ and $D$ represents the denominator of the expression for $G_{OL}$. Substituting the numerator and the denominator of equation (9) for $N$ and $D$, respectively, in equation (11) yields:

$$G_{CL}(s)=\frac{1+2\zeta_z\frac{s}{\omega_z}+\frac{s^2}{\omega_z^2}}{1+\frac{s}{\omega_z}\left(2\zeta_z+\frac{\omega_z}{K}\right)+\frac{s^2}{\omega_z^2}\left(\frac{2\zeta_p\omega_z^2}{K\omega_p}+1\right)+\frac{s^3}{\omega_p^2K}} \quad (12)$$

When designing a phase-lock demodulator in accordance with the invention, the designer is usually given the maximum modulating frequency, normally referred to as the top baseband frequency $f_b$, and the RMS modulation index $M$ of the signals it is desired to process in the demodulator. Moreover, the maximum allowable noise power ratio $NPR$ is usually specified as a performance parameter. In the design of the loop filter 14, the pole resonant frequency $f_p=\omega_p/2\pi$ is first selected in accordance with the top baseband frequency $f_b$ and, in order to maximize the open loop gain $G_{OL}$ throughout the baseband, the pole resonant frequency $f_p$ may be made equal to the top baseband frequency $f_b$, for example.

Appropriate values for the filter attenuation constant $\alpha$ and the zero damping ratio $\zeta_z$ may then be selected in the following manner. The maximum phase-modulation error $\theta_m$ is computed from the given maximum allowable noise power ratio $NPR$ using:

$NPR \cong 3+40\log 1/\theta_m$ db. (13) and the ratio of the given RMS modulation index $M$ to maximum allowable phase modulation error $\theta_m$ is calculated. A family of values for the filter attenuation constant $\alpha$ and the zero damping ratio $\zeta_z$ corresponding to the calculated $M/\theta_m$ may be found using the graph of FIG. 6 which plots the ratio of RMS modulation index $M$ to phase modulation error $\theta_m$ as a function of the filter attenuation constant $\alpha$ for various values of the zero damping ratio $\zeta_z$. The particular values of $\alpha$ and $\zeta_z$ which minimize the noise bandwidth may then be -selected from the aforementioned family of such values by using the graph of FIG. 7, which plots the ratio of one-sided noise bandwidth $B_o$ to top baseband frequency $f_b$ as a function of the filter attenuation constant $\alpha$ for various values of the zero damping ratio $\zeta_z$. The previously selected family of values for $\alpha$ and $\zeta_z$ may be plotted on FIG. 7 and the particular combination of $\alpha$ and $\zeta_z$ selected which provides the lowest ratio of one-sided noise bandwidth $B_o$ to top baseband frequency $f_b$.

Once $\alpha$ and $\zeta_z$ have been determined, the zero resonant frequency $\omega_z$ may be calculated using equation (4), and the pole-damping ratio $\zeta_p$ calculated by means of equation (6). Appropriate values for $L$, $C$ and $R_2$ may then be determined using equations (3) and (5) when the active filter of FIG. 2 is to be employed, while appropriate values for $L$, $C$ and $R_3$ may be found for the passive filter of FIG. 3, using equations (1), (3) and (5). For the filter of FIG. 1, a value for $R_1$ which optimizes the open-loop gain may be calculated using:

$$R_1=\frac{\alpha K_\phi K_v R_2\zeta_z}{0.28f_b(\alpha+1)^2} \quad (14)$$

The following parameter values are given as examples of particular values which have been used in the design of a loop filter according to FIG. 2. However, it should be understood that these specific values are offered solely for purposes of illustration, and other values are also suitable.

$f_b=f_p=552$ kHz.
$M=2.25$
$NPR \approx 45$ db.
$K_\phi=0.5$ volts per radian
$K_v=2\pi\times10^7$ radians per second per volt
$\theta_m \leq 1/11.2$ radians
$M/\theta_m=25.2$
$\alpha=3.4$
$\zeta_z=0.3$
$L=100\ \mu h$
$C=200$ pf
$R_2=120$ ohms
$R_1=1300$ ohms Referring to FIG. 8, curve 60 illustrates the open-loop gain $G_{OL}$ in db. as a function of modulating frequency $f_m$ for a phase-lock demodulator according to the invention using values of $M=4$, $\theta^2_m=1/300$, $\zeta_z=0.3$, and $\alpha=6$. It may be seen from portion 62 of curve 60 that the open-loop gain $G_{OL}$ is substantially constant and at a relatively high level of over 40 db. up to the top baseband frequency $f_b$. Then, as the modulating frequency is increased beyond the baseband frequency $f_b$, the open-loop gain $G_{OL}$ decreases at a very rapid rate of around 31 db. per octave along curve portion 64, the rate eventually reducing to 6 db. per octave at frequencies above $10f_b$ as shown by curve portion 66.

Figure 6:
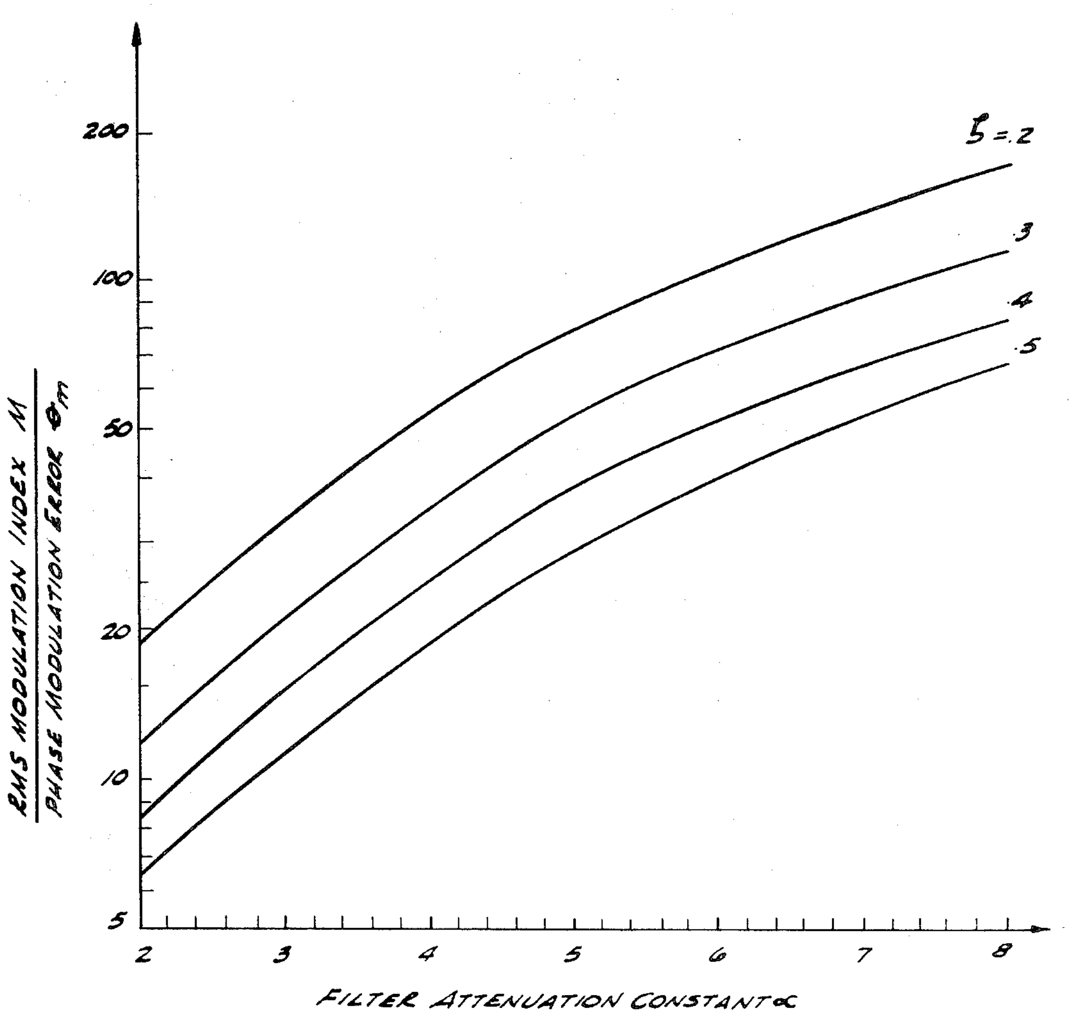
FIGS. 6 and 7 are graphs which may be used in selecting appropriate values for the filter attenuation constant $\alpha$ and the zero damping ratio $\zeta_z$ when designing a demodulator according to the invention.
Figure 7:
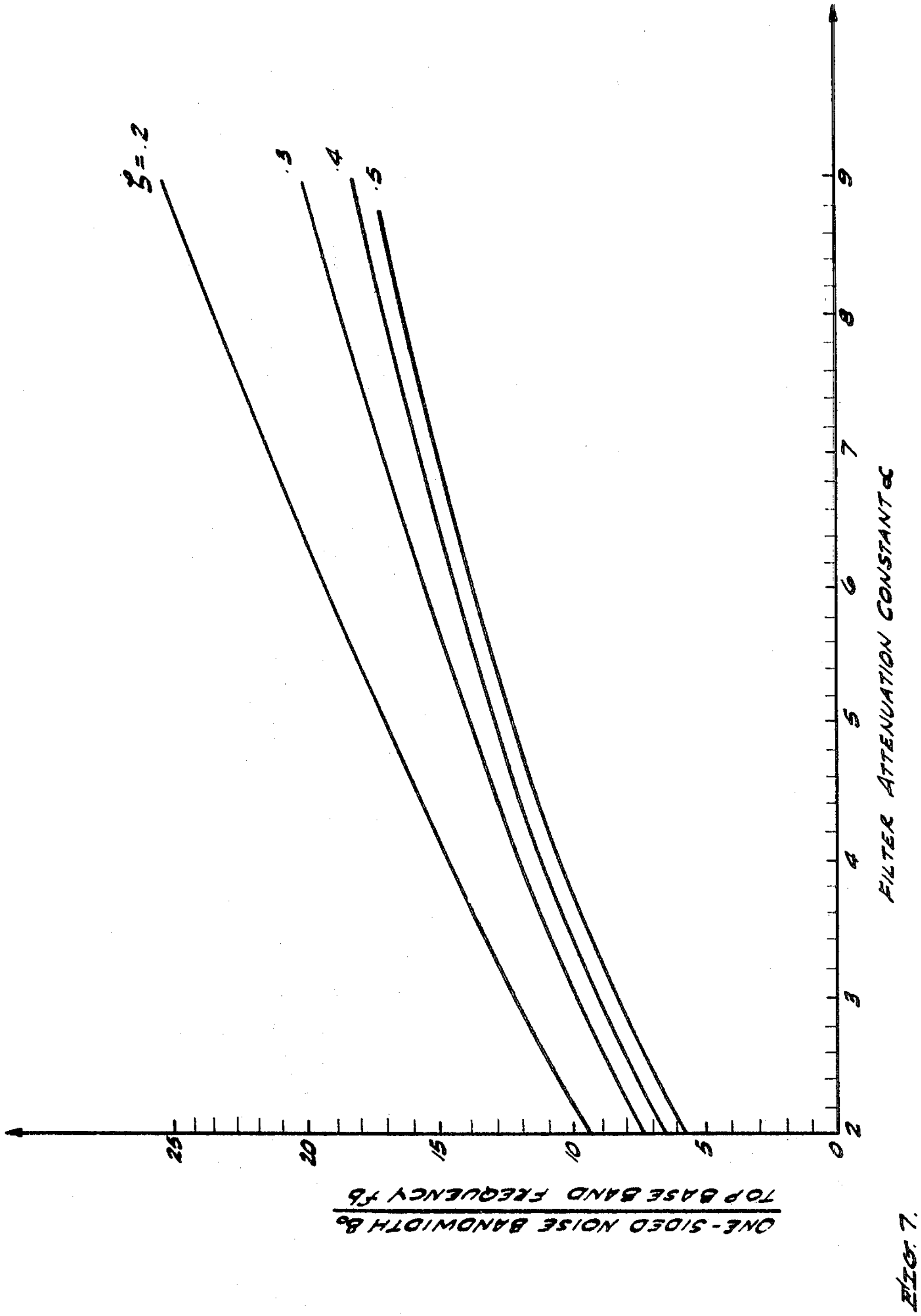

For purposes of comparison, curve 70 of FIG. 6 shows the open-loop gain $G_{OL}$ as a function of modulating frequency $f_m$ for a third-order phase-lock loop demodulator of the prior art and also designed to process modulated input signals characterized by values of $M=4$ and $\theta^2_m=1/300$. As shown by curve 70, the open-loop gain $G_{OL}$ of the prior art demodulator decreases at essentially a uniform rate of around 8 db. per octave as the modulating frequency is increased from about $0.5f_b$ to almost $2f_b$. Since an ideal phase-lock demodulator should have a high and constant open-loop gain up to the top baseband frequency $f_b$ and an immediate cutoff to zero at $f_b$, it may be seen that the phase-lock demodulator of the invention far more closely approaches an ideal demodulator open-loop response than does the prior art. Thus, greater tracking fidelity is achieved with the demodulator of the invention.

It may also be seen from FIG. 6 that the modulating frequency at which the demodulator of the invention provides unity (0 db. open loop gain (shown by point 68 on curve 60) is considerably less than the modulating frequency at which the prior art third-order loop demodulator affords unity gain (point 72 on curve 70). As a result, the demodulator of the invention provides a reduced noise bandwidth, enabling a significant extension of the signal-to-noise threshold level and other improved signal-to-noise capabilities to be realized.

The aforementioned threshold extension and other signal-to-noise improvements may be better appreciated by referring to FIG. 9. As was mentioned above, frequency demodulators are characterized by a threshold level, above which the output signal-to-noise ratio increases linearly with an increasing input carrier-to-noise ratio, but below which a very rapid deterioration of the output signal-to-noise ratio occurs for a slight decrease in the input carrier-to-noise ratio. In FIG. 9 curve 80 represents the threshold level for a phase-lock demodulator according to the invention using the same parameter values as mentioned above with respect to the curve 60 of FIG. 8, while curve 90 illustrates the threshold level for a prior art third-order loop demodulator using the same parameter values as mentioned above with respect to the curve 70 of FIG. 8.

It may be seen from FIG. 9 that not only does the demodulator of the invention extend the carrier-to-noise threshold level by at least 1.5 db. but, in addition, as the modulation index $M$ is increased, the threshold level of the demodulator of the invention increases more slowly than the threshold level of the prior art demodulator. Thus, for the same input carrier-to-noise ratio, the modulation index $M$ can be increased so as to produce a higher signal-to-noise ratio with the demodulator of the invention than with the prior art demodulator. For example, with the prior art demodulator, for an input carrier-to-noise ratio of 15 db. the modulation index can be increased from 1 to 2 (i.e., from point 92 to point 94 along dashed line 91 of FIG. 9) and the demodulator will still operate above the threshold level. However, with the demodulator of the invention, the modulation index can be increased to more than 4 (as shown by point 96 on curve 91) and the demodulator will still operate above the threshold level. Thus, for the same input carrier-to-noise ratio, the demodulator of the invention can provide a higher output signal-to-noise ratio than the prior art. Moreover, the demodulator of the invention achieves the aforementioned improved signal-to-noise capabilities while retaining relative design simplicity and highly stable operation.

Although the invention has been shown and described with reference to particular embodiments, nevertheless, various changes and modifications obvious to one skilled in the art to which the invention pertains are deemed to lie within the purview of the invention.

What is claimed is:

1. A phase-lock demodulator comprising: phase detector means for providing a signal indicative of the instantaneous frequency difference between the frequency of an input signal and the frequency of a reference signal; voltage-controlled oscillator means for generating said reference signal; and a filter coupled in a phase-lock loop between said phase detector means and said voltage-controlled oscillator means, said filter having a complex frequency signal transfer function $F(s)$ given essentially by $$F(s) = K_f \frac{1 + 2\zeta_z \frac{s}{\omega_z} + \frac{s^2}{\omega_z^2}}{1 + 2\zeta_p \frac{s}{\omega_p} + \frac{s^2}{\omega_p^2}},$$

where $K_f$ is a preselected scale factor, $\omega_z$ and $\omega_p$ are frequencies of conjugate complex zeros and poles, respectively, with $|\omega_z| > |\omega_p|$, and $\zeta_z$ and $\zeta_p$ are damping ratios of the complex zeros and poles, respectively, with $\zeta_p < \zeta_z < 1$.

2. A phase-lock demodulator according to claim 1 wherein said filter includes: an input terminal, an output terminal, and a common terminal; an amplifier having an output coupled to said output terminal; means for providing a first resistance between said input terminal and an input to said amplifier; means for providing a second resistance and a capacitance in series between the input and the output of said amplifier; means for providing a third resistance in parallel with said second resistance and said capacitance; and means for providing an inductance between the junction between said second resistance and said capacitance and said common terminal.

3. A phase-lock demodulator according to claim 1 wherein said filter includes: an input terminal, an output terminal, and a common terminal; means for providing a first inductance between said input and said output terminals; and means for providing a second inductance, a capacitance, and a resistance in series between said output and said common terminals.